H. L. HERRENSCHMIDT.
APPARATUS FOR TREATING ANTIMONY ORES.
APPLICATION FILED OCT. 1, 1908.
953,142.
Patented Mar. 29, 1910.
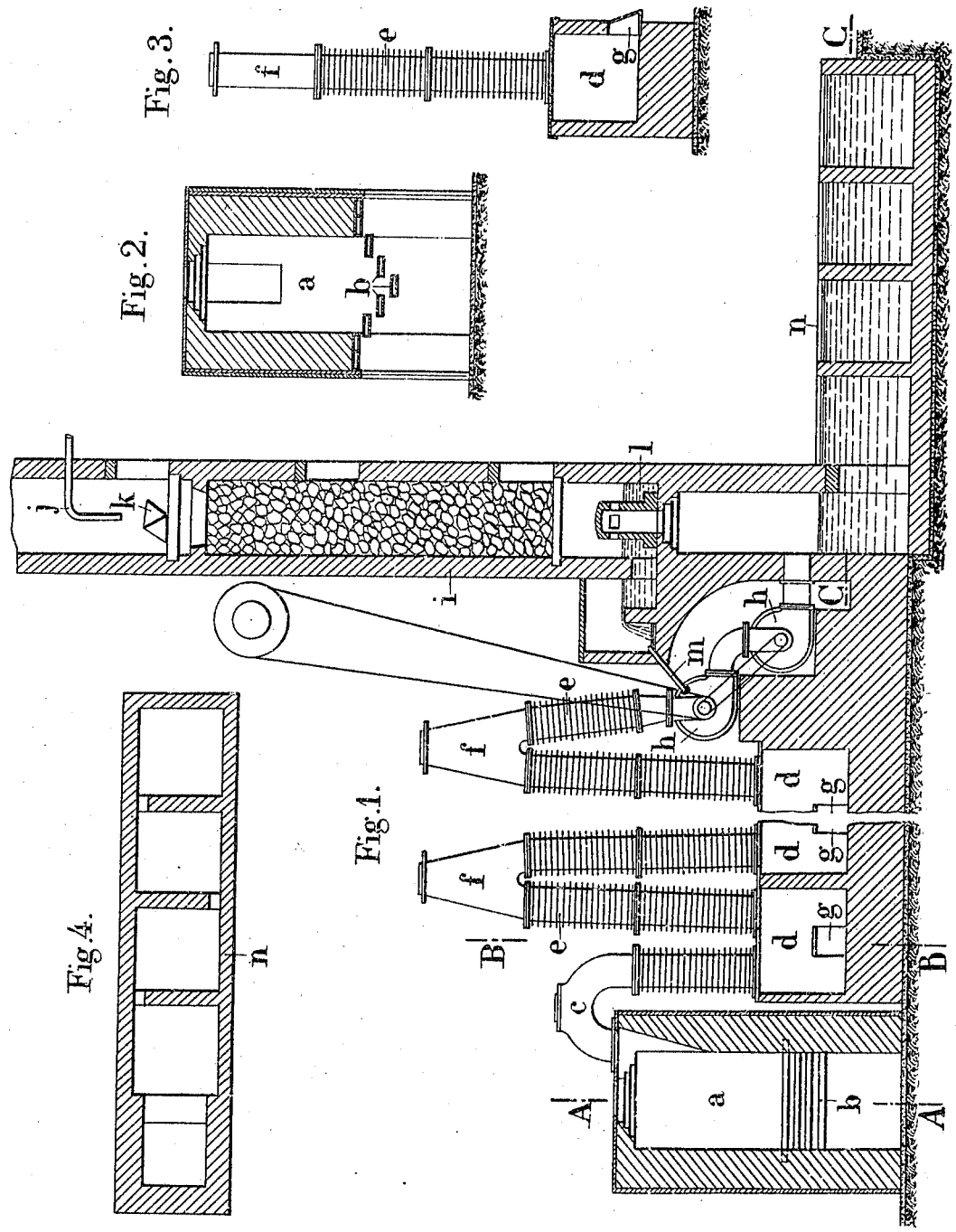

UNITED STATES PATENT OFFICE.

HENRI LOUIS HERRENSCHMIDT, OF PARIS, FRANCE.

APPARATUS FOR TREATING ANTIMONY ORES.

953,142. Specification of Letters Patent. Patented Mar. 29, 1910.

Original application filed June 14, 1907, Serial No. 379,050. Divided and this application filed October 1, 1908. Serial No. 455,723.

*To all whom it may concern:*

Be it known that I, HENRI LOUIS HERRENSCHMIDT, a citizen of the French Republic, and resident of Paris, France, have invented certain new and useful Improvements in Apparatus for Treating Antimony Ores, of which the following is a specification.

The object of my invention is to provide an apparatus for treating antimonious ores containing arsenic to recover the antimony completely freed from arsenic in whatever proportions the latter may be present.

According to my invention the arsenical antimony ore previously coarsely graded or crushed is treated in the roasting furnace so as to cause it to give off a mixture of oxid of antimony and arsenious acid together with sulfur dioxid which is separated and subsequently utilized as hereinafter described. The roasting of the ore is performed at a low temperature, say at about 400 deg. C. in order to obviate any agglomeration of residue in the furnace to permit of the employment of cast metal apparatus and to reduce fuel consumption. The finely divided ores are mixed either with carbonate of soda and lime, with soda waste to which has been added carbonate or sulfate of soda, or with sulfid of sodium. The mixture thus obtained is charged into an autoclave containing water which is then boiled until the pressure reaches about four or five atmospheres. During this operation there is formed a mixture of antimoniate or sulfo-antimoniate of soda (or both) and of arsenate or sulfo-arsenate of soda (or both). After the completion of this operation the contents of the autoclave are discharged into a vat and a liquor titrating 2 to 8 deg. Bé. is drawn off containing the above-mentioned mixture of antimoniate or sulfo-antimoniate of soda and arsenate or sulfo-arsenate of soda (or both). This liquor is then caused to react with the mixture of oxid of antimony and arsenious acid resulting from the above-mentioned furnace treatment of the coarse ore. In this reaction there are formed oxids or sulfids of antimony (or both) which remain mixed with the acids of antimony first obtained while the arsenic dissolves in the solution containing the sulfo-arsenate of soda (or both) and the antimoniate of sulfo-antimoniate of soda in excess. The sulfids and oxids of antimony thus freed from arsenic may be collected by filtration or by decantation and are thereafter mixed with a flux and fused whereby regulus of antimony free from arsenic is obtained. The antimony contained by the liquor into which the arsenic has passed is then separated therefrom, either by means of the sulfur dioxid disengaged during the roasting of the coarse ore, or by means of any other suitable acid, sulfid of antimony being thus formed, while arsenate or sulfo-arsenate of soda mixed with sulfate of soda remain in the solution. Sulfid of antimony is separated and is either converted into oxid or reduced to the metallic form. The sulfite of soda is finally freed from arsenate, or sulfo-arsenate of soda by crystallization.

An example of the apparatus is illustrated in the accompanying drawing, in which—

Figure 1 is a longitudinal section; Figs. 2 and 3 are transverse vertical sections on lines A—A and B—B respectively of Fig. 1, and Fig. 4 is a horizontal section on line C—C of Fig. 1.

As shown in Fig. 1, the apparatus comprises in the first place a roasting furnace *a* provided with hollow fire bars *b* arranged in steps and symmetrically disposed so as to permit the residues, freed from antimony and arsenic to easily fall through the grate as the roasting proceeds. The ore is mixed in the furnace with a very small quantity of coke, say from 3 to 5%, with the object of conducting the roasting at as low a temperature as practicable, viz., about 400 deg. C., under which condition the volatilization of the antimony and arsenic may be effected without any agglomeration of the residues being occasioned, the latter remaining in a divided state which permits of their easy withdrawal from between the fire bars.

The low temperature under which the volatilization of the arsenic and antimony is effected renders it possible to employ pipes *c* of cast iron for conducting the gases directly from the furnace outlet to the condensing apparatus. The condensing apparatus is constituted by a series of masonry or by metal (wrought or cast iron) chambers or compartments *d* surmounted and connected by ribbed or "gilled" pipes *e* whereof each pair connecting consecutive chambers or compartments *d* are connected by unions $f$ as illustrated. Each chamber $d$ is provided at its lower part with a door $g$ to enable the oxids of antimony and arsenious acid to be removed as they become condensed and while the furnace is in operation. The gases (sulfurous acid, oxid of antimony and uncondensed arsenious acid) are drawn off by means of aspirators $h$ and driven into the base of a reaction tower $i$. The liquor containing the antimoniate or sulfo-antimoniate of soda and arsenate or sulfo-arsenate of soda resulting as above described from the treatment of the finely divided ores in the autoclave, is fed into the upper part of this tower by the pipe $j$ and falls on to the tippler $k$ whereby it is discharged in streams on to the coke below. The said liquor falls through the coke into the tank $l$ situated at the lower part of the tower, a constant level being maintained in said tank by overflowing through a launder $m$ into the aspirators $h$, whence it escapes to a receptacle. The liquor which overflows from the tank at a constant level $l$ into the aspirator $h$ and which contains oxid and sulfid of antimony in suspension in sodium sulfite and arsenate or sulfo-arsenate finally flows into the settling tanks $n$.

The above described arrangement of apparatus offers the following advantages. 1st. The winning of antimony completely free from arsenic whatever proportion of the latter may be present in the ore treated. 2nd. Economy in fuel consumption. 3rd. The employment of cast iron in the construction of those parts of the apparatus in immediate proximity to the exit of the furnace, thus lessening the cost of the installation, rendering the apparatus less cumbrous and capable of being quickly erected, and when necessary taken down and reërected. 4th. The possibility of collecting the oxids of antimony and the arsenious acid as they are condensed without interfering with the operation of the furnace. 5th. The quick starting and stopping of the operation and the stopping thereof without inconvenience.

The apparatus may be employed equally well for treating other ores of zinc, mercury and the like.

My present application is a division of one filed by me on or about June 14th, 1907, Serial No. 379,050.

I claim as my invention:

1. Apparatus for the treatment of ores, comprising a roasting furnace; condensing apparatus connected directly to the furnace and constituted by a series of gilled or ribbed pipes surmounting and connecting precipitating chambers provided with means for withdrawing the oxids of antimony and arsenious acid as they are condensed while the furnace is at work; a reaction tower adapted to be traversed from top to bottom by an alkaline and arsenical liquor and from bottom to top by sulfurous acid; suction apparatus interposed between the condensing apparatus and the reaction tower for the purpose of promoting the flow of gases traversing the condensing apparatus, causing said gases to mix with the liquor flowing from the reaction tower and finally driving the gases which have escaped condensation into the reaction tower.

2. Apparatus for the treatment of ores, comprising a roasting furnace with a hearth having stepped fire bars symmetrically arranged; condensing apparatus connected directly to the furnace by a cast iron conduit and constituted by a series of "gilled" or ribbed pipes surmounting and connecting precipitating chambers provided with means for withdrawing the oxids of antimony and arsenious acid as they are condensed while the furnace is at work; a re-action tower adapted to be traversed from top to bottom by an alkaline and arsenical liquor and from bottom to top by sulfurous acid; a conduit connecting the condensing apparatus with the tower, means for conveying liquor from the reaction tower to said conduit, means in said conduit for causing suction for the purpose of promoting the flow of gases traversing the condensing apparatus and for mixing said gases with the liquor flowing from the reaction tower and for finally driving the gases which have escaped condensation into the re-action tower.

In testimony whereof I have hereunto set my hand in the presence of two subscribing witnesses.

HENRI LOUIS HERRENSCHMIDT.

Witnesses:
   H. C. COXE,
   MAURICE H. PIGUET.